United States Patent [19]

Ryan

[11] Patent Number: 4,725,509

[45] Date of Patent: Feb. 16, 1988

[54] TITANIUM-COPPER-NICKEL BRAZE FILLER METAL AND METHOD OF BRAZING

[75] Inventor: Edward J. Ryan, Wallingford, Conn.

[73] Assignee: United Technologies Corporation, Hartford, Conn.

[21] Appl. No.: 830,779

[22] Filed: Feb. 18, 1986

[51] Int. Cl.⁴ .................. B32B 15/04; B23K 35/28
[52] U.S. Cl. ............................. 428/607; 428/660; 428/675; 228/263.21
[58] Field of Search .............. 428/607, 660, 675; 420/417; 228/263.21, 263.13, 263.14, 56.3

[56] References Cited

U.S. PATENT DOCUMENTS

| | | | |
|---|---|---|---|
| 2,674,542 | 4/1954 | Alexander | 420/417 |
| 2,822,269 | 2/1958 | Long | 420/417 |
| 3,083,448 | 4/1963 | Moore et al. | 420/417 |
| 3,652,237 | 3/1972 | Mizuhara | 29/198 |
| 3,683,488 | 8/1972 | Cook et al. | 29/472.3 |
| 3,768,985 | 10/1973 | Woodward | 29/191 |
| 3,769,101 | 10/1973 | Woodward | 148/127 |
| 3,854,194 | 12/1974 | Woodward | 29/494 |
| 3,957,194 | 5/1976 | Woodward | 228/194 |
| 3,981,429 | 9/1976 | Parker | 228/194 |
| 4,026,677 | 5/1977 | Galasso et al. | 428/649 |
| 4,029,479 | 6/1977 | Parker | 428/660 |
| 4,034,454 | 7/1977 | Galasso et al. | 428/576 |
| 4,034,906 | 7/1977 | Carlson et al. | 228/194 |
| 4,318,965 | 3/1982 | Blair | 428/593 |
| 4,448,853 | 5/1984 | Fischer et al. | 428/661 |
| 4,514,470 | 4/1985 | Rosenthal et al. | 428/675 |
| 4,562,121 | 12/1985 | Thiemann et al. | 428/673 |
| 4,624,897 | 11/1986 | Ito | 428/660 |

FOREIGN PATENT DOCUMENTS

| | | | |
|---|---|---|---|
| 211909 | 10/1956 | Australia | 420/417 |
| 10932 | 3/1971 | Japan | 420/417 |

OTHER PUBLICATIONS

"Titanium-Copper-Nickel Alloy for Soldering Titanium to Stainless Steels", Takeuchi, Feb. 1966, Chem. Abs. 76:36832f.

"Brazing of Nickel to Ceramic Materials", Green, Oct. 1972, Chem. Abs. 78:19777r.

"Study of the Composition of Phases Originating in the Interaction of Ti-Containing Solders with Aluminum Ceramics", Bushkov, 1981, Chem. Abs. 97:132200c.

"Laminated Brazing Filler Metals for Titanium Assemblies", Lan, 1982, Chem. Abs. 98:112100n.

V. P. Chepeleva, "Structure and Phase Composition of Ti-Ni-Cu Alloys", Poroshkovaya Metallurgiya, No. 7 (259), pp. 52-57, Jul. 1984.

"Phase Equilibria in the Ti Rich Region of Ti-Ni-Cu System", M. Yakushiji, Y. Kondo and K. Kamei, Nihon Kinzoku Gakkai Shi, vol. 46, No. 6, (1982), 571-577.

"Phase State of the System Ti-Ti₂Ni—Ti₂Cu", P. B. Budbert and S. P. Alisova.

Primary Examiner—John J. Zimmerman
Attorney, Agent, or Firm—James M. Rashid

[57] ABSTRACT

A filler metal material particularly suited for brazing titanium base articles is described. In a preferred embodiment, the material is characterized by a central portion of titanium, and adjacent layers of copper and nickel. The solidus and liquidus temperatures of the filler metal are about 925° and 945° C., respectively.

9 Claims, 3 Drawing Figures

FIG. 1a
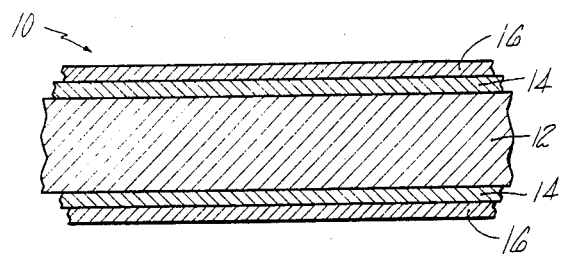
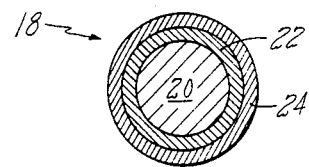
FIG. 1b

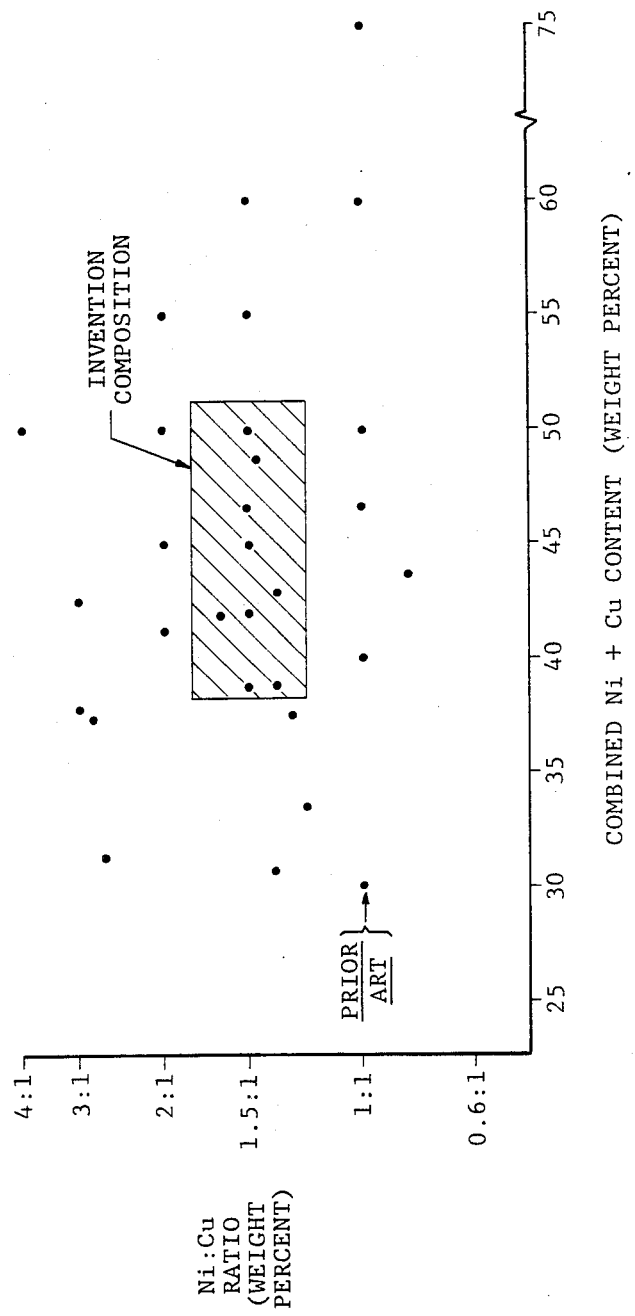

TITANIUM-COPPER-NICKEL BRAZE FILLER METAL AND METHOD OF BRAZING

TECHNICAL FIELD

The present invention relates to brazing filler metals. In particular, it relates to brazing filler metals which contain titanium, copper, and nickel, and are useful in brazing titanium base articles.

BACKGROUND

Aside from purely mechanical methods, the prior art shows three methods for the joining of titanium base articles: welding, brazing, and diffusion bonding. A fourth method, liquid interface diffusion (LID) bonding, may be characterized as a hybrid of brazing and diffusion bonding. Welding, brazing, and LID bonding each use a filler metal to bridge the joint between the articles.

One brazing filler metal composition for brazing titanium base articles is described in U.S. Pat. No. 3,652,237. The filler is fabricated as a foil, and has a nominal composition of, by weight percent, Ti-15Ni-15Cu. The filler has a composite structure, characterized by one or more layers each of copper and nickel surrounded by an outer layer of titanium. The foil suffers from two significant problems: first, when the filler melts, the liquid must penetrate inevitable layers of titanium oxide on the foil surfaces and on the faying surface of each article. Such oxide barriers are an impediment to optimum joint formation. Second, it has been found that the distance between the faying surfaces must be small in order to avoid the formation of voids or cracks in the braze joint. Such discontinuities are apparently caused by an inadequate supply of liquid filler metal to the gap between the articles being joined.

Other braze foils are described in U.S. Pat. Nos. 4,026,677, 4,034,454, and 4,034,906. These filler metals are, generally, Ti-50Zr foils having a layer of Cu or layers of Cu and Be. Due to the toxicity of Be, its use is discouraged. The low melting point of the Ti-Zr-Cu foils precludes their use in some applications.

Various braze alloys for joining honeycomb to a facing sheet are described in U.S. Pat. No. 3,683,488. Layers of metal such as Au, Ni, Ag, and Cu are electroplated onto the honeycomb cell walls. However, plating onto honeycomb is difficult, and engineers have sought improved methods for brazing.

Filler metals for use in the LID bonding of titanium have been the subject of numerous patents. See, e.g., U.S. Pat. Nos. 3768,985, 3,769,101, 3,854,194, 3,981,429, 4,029,479, and 4,318,965. Each of these patents describes a Ni-Ag-Cu filler metal system wherein the copper and nickel are present in equal amounts. Layers of the three elements are deposited onto the faying surface of one of the parts to be joined, or layers are deposited onto a very thin titanium foil which is then disposed between the parts. The total thickness of the electroplated foil is about 15 microns. The thin filler is capable of providing only a small amount of liquid to the joint, and due to rapid diffusion which occurs during the bonding process, the filler is liquid for only a short period of time (see U.S. Pat. No. 3,854,194 at column 5, line 37). Such rapid diffusion may preclude adequate joint formation. Additionally, the favored LID bonding temperature for these filler metal systems is about 970° C. (see U.S. Pat. No. 3,981,429 at column 3, line 7) which may preclude their use in joining some titanium alloys. Furthermore, titanium base articles joined with filler metals containing silver have been observed to fracture prematurely during service; these fractures appear to initiate at Ti-Ag intermetallics which form during the bonding process.

Layers of copper, nickel, and copper are sequentially plated onto the cell walls of titanium honeycomb for LID bonding according to U.S. Pat. No. 3,957,194. As noted above, plating on honeycomb is undesired.

Notwithstanding the availability of the brazing and LID bonding filler metals used to join titanium base substrates described above, each suffers from one or more drawbacks which limits its use. Consequently, researchers are continually striving to improve upon the existing state of the art. Specifically, they seek to define an improved filler metal for use in the brazing of titanium base articles, wherein the melting and solidification characteristics of the filler metal are such that wide gaps between the faying surfaces are tolerated, while at the same time, the braze joint has tensile properties comparable to those of the parent material.

SUMMARY OF THE INVENTION

According to the present invention, a brazing filler metal consists essentially of titanium (or an alloy thereof), nickel, and copper, wherein the weight percent ratio of nickel to copper is about 3:2, and the combined Ni+Cu content is between about 39–51 weight percent. Preferably, the filler metal has a central titanium base portion and adjacent layers of copper and nickel thereon. Most preferably, the layer of copper is adjacent to the central titanium base portion, and the layer of nickel is adjacent to the copper layer. A preferred filler metal composition is, by weight percent, about 28 Ni, 17 Cu, with the balance Ti. The filler metal is particularly useful in brazing metallic articles which are titanium or titanium base alloys. It is also useful in brazing titanium base alloys to alloys based on nickel, iron, or cobalt.

The invention filler metal compositions, having unequal amounts of nickel and copper, have been found to have significantly better brazing characteristics than the prior art brazing and LID bonding filler metals, which teach the use of nickel and copper in equal amounts. Specifically, when the invention filler metals melt, they have better flow characteristics than the prior art fillers. That is, they fill the gap between the faying surfaces better, and allow assemblies having relatively wide gaps to be successfully and securely brazed.

The foregoing and other objects, features and advantages of the present invention will become more apparent from the following description of preferred embodiments and accompanying drawings.

BRIEF DESCRIPTION OF THE DRAWINGS

FIG. 1a is a schematic cross sectional view of the filler metal in foil form;

FIG. 1b is a schematic cross sectional view of the filler metal in wire and powder form; and FIG. 2 is a graphical representation showing the various compositions of filler metals evaluated in brazing tests.

BEST MODE FOR CARRYING OUT THE INVENTION

The filler metal of the present invention is particularly adapted for brazing pure titanium or titanium base alloys. Tests have also shown that the filler metal may be used to join a titanium base article to a nickel, iron, or cobalt base article. The filler metal has an approximate solidus temperature of 925° C. (1,700° F.) and an approximate liquidus temperature of 945° C. (1,735° F). Joints produced by the filler metal have tensile properties comparable to base metal properties. The filler metal may be produced in various forms, including foil, wire, and powder. It may be fabricated as a homogeneous alloy, or, as is preferred, as a heterogeneous composite structure, e.g., having discrete layers of each of the constituents titanium, nickel, and copper. Thus, in this specification and claims, the term "filler metal" is meant to describe homogeneous as well as heterogeneous materials. The titanium may be either elemental titanium (commercially pure), or it may be a titanium base alloy such as Ti-6Al-4V.

For fabricating the filler metal in foil form, commercially pure (CP) foil as described in Aerospace Materials Specification (AMS) 4900, 4901, or 4902 may be used. For fabricating the filler metal in wire form, CP wire as described in AMS 4951 may be used. For fabricating the filler metal in powder form, unalloyed titanium powder or alloyed powder such as Ti-6Al-4V (AMS 4998) may be used. Those skilled in the art recognize that the choice of the particular filler metal form depends on the design configuration of the joint being brazed. In applications which utilize braze foil, the nominal thickness of the foil is about 0.005–0.010 cm. In applications which utilize braze wire, the nominal thickness of the wire is about 0.050–0.125 cm. In applications which utilize braze powder, the nominal powder mesh size (Tyler Sieve Series) is, by weight, 90% (minimum) −80 mesh, 5% (maximum) −200 mesh. When the powder is fabricated into the form of tape, flexible cord, or paste, as in, e.g., U.S. Pat. Nos. 3,293,072 and 4,546,047 which are incorporated by reference, the vehicle or binder should be flux free and capable of volatilizing without undesirably affecting the joint (e.g., volatilize without leaving behind any residue). The powder may also be thermally sprayed or adhesively bonded to the workpieces.

When foil filler metal is used to braze the workpieces, it is disposed between the faying surfaces of the workpieces. Wire filler metal is typically applied adjacent to the faying surfaces. Powder may be applied either between or adjacent to the faying surfaces. For the purposes of this specification and attached claims, use of the word "between" in this context is intended to mean between or adjacent to the faying surfaces.

Cross sectional views of the heterogeneous (layered) filler metal are shown in FIGS. 1a–1b. As is seen in FIG. 1a, the filler metal 10 in foil form comprises a central titanium base foil 12, a layer of copper 14 adjacent to the titanium foil 12, and a layer of nickel 16 adjacent to the copper layer 14. Shown in FIG. 1b is the filler metal 18 in wire and powder form. The filler 18 comprises a central titanium base wire or powder particle (as the case may be) 20 surrounded by a layer of copper 22, and a layer of nickel 24 surrounding the copper layer 22. (For simplicity, the wire and powder particle are shown in the FIGURE as having a circular cross section. The invention is not limited to such a shape, but may include other shapes as well.) In the preferred embodiment of the invention, nickel is preferred as the "outside" layer because it provides a surface which is easy to handle and keep clean, thereby extending the shelf life of the filler.

The layers of nickel and copper may be applied by plating, using either electrodeposition or electroless deposition techniques known in the art. The latter technique may be used for applying nickel to copper plated titanium base powder particles. In such electroless deposition, the composition of the nickel layer is likely to contain some phosphorus, which is typically present in the electroless nickel plating bath. However, the phosphorus does not seem to affect the brazing characteristics of the powder. Physical or chemical deposition of the nickel and copper layers by e.g., sputtering or chemical vapor deposition, may also be used.

In an alternate embodiment of the invention, there are multiple layers of copper and nickel, not necessarily equal in number, surrounding the center titanium portion.

The nickel and copper layers need not be applied as discrete layers, but may be deposited as an alloy. However, for ease of application, discrete layers are preferred.

Of course, it should be recognized that while the layered structure produced as described above is preferred, the filler metal of the invention may be produced by other techniques. For example, the filler metal may be produced as a homogeneous alloy. Such an alloy is probably most readily fabricated in powder form. For example, to fabricate alloyed powder, techniques such as rapid solidification rate (RSR) processing may be used, as well as other techniques known in the art. While not the preferred technique for the practice of the invention, titanium, nickel and copper powder particles could be disposed adjacent to or between the faying surface of the articles being joined, the quantity of each being such that the invention composition described in more detail below, is achieved. Or, nickel plated titanium powder could be applied with copper powder. An even further alternative would be to apply nickel plated titanium powder and copper plated titanium powder. Other such alternatives should be apparent. As with the first example above, the quantities of each constituent must be such that the invention composition is achieved.

Other potential methods for producing the filler metal include rolling titanium, copper and nickel sheets to produce a composite foil, or extruding layers of copper and nickel on a titanium base wire. The thicknesses of the foils, layers, etc. must be chosen to obtain the invention composition.

The preferred, layered structure of the brazing filler metal of this invention is distinguishable from the Ti-Cu-Ag-Ni LID bonding interlayer (U.S. Pat. No. 3,981,429) and the Ti-Cu-Ni brazing interlayer (U.S. Pat. No. 3,652,237) discussed in the Background Art section. The Ti-Cu-Ag-Ni interlayer is extremely thin (about 15 microns), and upon melting, provides only a small amount of liquid to the gap between the pieces to be joined. As a result, the gap must be very small, which generally precludes the use of such a filler in joining components wherein close fit-ups cannot readily be achieved. Additionally, this patent, as well as the Ti-Cu-Ni interlayer patent, teaches only the use of equal amounts of copper and nickel in the interlayer. However, as discussed below, significant improvements in braze joint quality are achieved when the amount of nickel is in excess of the amount of copper.

FIG. 2 shows the composition of various filler metals used to braze AMS 4911 T-joint specimens. All filler metals were in foil form, and with the exception of the "Prior Art" material (Ti-15Cu-15Ni composition with Ti-Cu-Ni-Ti layering sequence, U.S. Pat. No. 3,652,237) all were characterized by an inner portion of titanium and adjacent layers of copper and nickel, i.e., Ni-Cu-Ti-Cu-Ni layered structures. The prior art material was about 0.005 cm thick, while the other materials were about 0.009 cm thick. In these other materials, the central titanium portion was about 0.005 cm thick, and the individual thickness of the copper and nickel layers was about 0.001 cm on each side. After vacuum brazing at 955° C. for 1 hour, cooling to 925° C. and holding for 1 hour, visual and metallographic examination indicated that only the compositions within the shaded region in FIG. 2 labelled "Invention Composition" provided braze joints characterized by no voids or cracks. Also, only these filler metal compositions flowed and completely filled in the discontinuities between the component pieces. Furthermore, there was no residual (i.e., unalloyed) copper observed in these joints. In comparison, the compositions outside of the shaded region produced incomplete joints characterized by the existence of cracks and voids. Residual copper which could degrade properties was also observed with these compositions. Upon melting, the compositions in the lower left portion of the Figure (and outside of the "Invention Composition") rapidly diffused into the components being joined and accordingly, there was little liquid metal available to flow between the faying surfaces to form a continuous joint. As a result, such compositions are not likely useful in brazing components wherein close fit-ups cannot readily be achieved. Compositions in the upper left and lower right portions of the Figure supplied more liquid between the faying surfaces (compared to the lower left compositions), but still not enough to form a continuous joint. Compositions in the upper right hand portion of the FIGURE produced too much liquid, as evidenced by an excessive amount of dissolution of the T-joint components. This also indicates that diffusion of the liquid braze metal into the components was too slow. Accordingly, such compositions are undesirable for brazing thin sections such as honeycomb.

As is seen in the FIGURE, the composition range for the invention filler metal is by weight percent, about 15–21 Cu, 24–30 Ni, with the balance Ti or titanium base alloy. The weight percent ratio of Ni:Cu should be between about 1.2:1 to 1.85:1. In other words, the nickel content (by weight percent) should be between about 1.2–1.85X the copper content (by weight percent). The most preferred composition is 18 Cu, 27 Ni, with the balance Ti or Ti base alloy; in such a composition, the Ni:Cu ratio is 3:2. With such composition, the most preferred brazing cycle for brazing titanium base alloys such as Ti-6Al-4V is 1 hour at about 955° C., followed by 4 hours at about 925° C. However, other cycles may be used in brazing such alloys, as well as in brazing other alloys.

As an example of 0.0075 cm thick foil having the preferred Ti-18Cu-27Ni composition, the central titanium base portion is about 0.0050 cm thick, while the copper and nickel layers are each about 0.0006 cm thick, per side. For 0.100 cm thick circular cross section wire, the central titanium base portion is about 0.080 cm in diameter, while the combined thickness of the copper and nickel layers is about 0.020 cm. For −80 mesh Tyler Sieve Series plated powder, the bare (unplated) titanium base powder is nominally about 0.015 cm in diameter, while the combined thickness of the copper and nickel layers is about 0.002 cm.

Of course, it should be realized that some variation in the thickness of the copper and nickel layers is permissible. These layers must, however, be applied in the proper thickness proportions, corresponding with the dimension of the central titanium base portion, to yield the invention composition.

The preferred layered structure of this invention, i.e., nickel and copper layers on a titanium base substrate, is further distinguished from the Ti-Cu-Ni interlayer described in U.S. Pat. No. 3,652,237. This patent teaches a brazing foil wherein layers of titanium surround and hermetically seal a nickel and copper substrate. As noted in the Background Art section, a tenacious refractory oxide film forms on its outer titanium surface, which inhibits the formation of an optimum braze joint. The filler metal of the invention is characterized by layers of copper and nickel, or a copper-nickel alloy, applied onto the central titanium base portion. Since most, if not all, of the titanium base portion will be isolated from the atmosphere, the formation of this refractory oxide is precluded.

The data in FIG. 2 was generated by brazing AMS 4911 specimens. However, additional testing has shown that the invention brazing compositions are not only useful in brazing titanium base components to each other, but also, in brazing titanium base alloys to non-titanium base alloys such as nickel, cobalt, or iron base alloys. For example, the preferred invention composition has been found to be useful in brazing AMS 4975 (Ti-6Al-2Sn-4Zr-2Mo) to INCONEL ® Alloy 718 (Ni-19Cr-0.10C-18Fe-0.9Ti-0.6Al-3Mo-5.2Cb +Ta). Metallographic examination of the braze joints produced in these tests indicated sufficient diffusion of the filler metal onto the base materials, as well as no cracks or voids in the braze joint.

Although not wanting to be bound by any theory, it is believed that the reason the invention filler metal produces superior results is because there is apparently little isothermal solidification of the liquated filler metal while the braze assembly is at temperature, which allows the liquid to flow laterally within the gap between the workpieces. Not until the temperature is decreased does the melted filler metal solidify.

Of course, it is always advantageous to limit the gap between the faying surfaces being joined. However, in general, it is economically advantageous to increase the machining tolerances of the parts being joined, which results in the faying surfaces gap being increased. Tests have shown that gaps of up to 0.038 cm were successfully filled with the preferred composition. Additionally, the greater flow capability that this composition exhibits more efficiently fills in localized discontinuities of up to about 0.050 cm in depth (e.g., rough machining marks, handling defects) compared to prior art filler metals.

In tensile tests conducted on AMS 4911 specimens brazed with the invention filler metal, fracture occurred through the parent material rather than through the braze joint, thus indicating the tensile strength of the joint to be greater than parent material.

Although this invention has been shown and described with respect to a preferred embodiment, it will be understood by those skilled in the art that various changes in form and detail thereof may be made without departing from the spirit and scope of the claimed invention.

I claim:

1. A filler metal for brazing titanium base articles consisting essentially of a central titanium base portion and adjacent layers of different metals, wherein a layer of copper is adjacent to each side of the central titanium base portion and a layer of nickel is adjacent to the copper layers, and wherein the filter metal consists essentially of, by weight percent, 24–30 Ni, 15–21 Cu, with the balance Ti or Ti base alloy.

2. The filler metala of claim 1, consisting essentially of about 27 Ni, 18 Cu, balance Ti.

3. A braze assembly, comprising a pair of titanium base articles and a filler metal therebetween, wherein the filler metal consists essentially of a central titanium base portion, a copper layer adjacent to each side of the central titanium base portion, and a nickel layer adjacent to the copper layers, and wherein the nickel layer is adjacent to each titanium base article, the filler metal consisting essentially of about, by weight percent, 24–30 Ni, 15/21 Cu, balance Ti or Ti base alloy.

4. The assembly of claim 3, wherein the filler metal consists essentially of about 27 Ni; 18 Cu, balance Ti.

5. A brazing filler metal consisting essentially of nickel, copper, and titanium or titanium base alloy, wherein the weight percent of nickel is about 24–30 percent, and the weight percent of copper is about 15–21 percent, and wherein the filler metal consists essentially of a central titanium base portion, and adjacent layers of a copper-nickel alloy.

6. A method for brazing at least two metal articles, comprising the steps of providing a filler metal consisting esentially of, by weight percent, Ti or Ti base alloy, 24–30 Ni, 15–21 Cu between or adjacent to the articles to be brazed, to form a braze assembly; heating the assembly at a temperature to cause melting of the filler metal; and cooling the assembly, wherein the filler metal consists essentially of a central titanium base portion and adjacent of different metals, wherein a layer of copper is adjacent to each side of the central titanium portion and a layer of nickel is adjacent to the copper layers.

7. The method of claim 6, wherein both of said metal articles are titanium base.

8. The method of claim 6, wherein said metal articles are selected from the group consisting of titanium, nickel, cobalt, and iron base alloys.

9. The brazed article formed by the method of claim 6.

* * * * *